(12) United States Patent
Breau et al.

(10) Patent No.: US 8,032,115 B1
(45) Date of Patent: Oct. 4, 2011

(54) GLOBAL WIMAX DEVICE REGISTRY

(75) Inventors: Jeremy R. Breau, Kansas City, MO (US); John E. Belser, Olathe, KS (US); Tim L. Swan, Lees Summit, MO (US)

(73) Assignee: Clear Wireless LLC, Kirkland, WA (US)

( * ) Notice: Subject to any disclaimer, the term of this patent is extended or adjusted under 35 U.S.C. 154(b) by 546 days.

(21) Appl. No.: 11/671,247

(22) Filed: Feb. 5, 2007

(51) Int. Cl.
*H04M 1/66* (2006.01)

(52) U.S. Cl. .................. 455/411; 455/414.1; 455/435.1; 455/414.4; 455/432.2; 455/418; 380/270

(58) Field of Classification Search ............... 455/414.1, 455/426.2, 432.1, 436, 442, 411, 435.1, 435.2, 455/414.4, 414.2, 410, 418, 432.2, 432.3; 380/270
See application file for complete search history.

(56) References Cited

U.S. PATENT DOCUMENTS

| | | | |
|---|---|---|---|
| 6,304,746 B1 * | 10/2001 | Fascenda et al. | 340/7.53 |
| 6,856,604 B2 * | 2/2005 | Lundby | 370/312 |
| 7,308,261 B2 * | 12/2007 | Henderson et al. | 455/435.1 |
| 7,412,405 B2 * | 8/2008 | Huang et al. | 705/14.39 |
| 7,937,751 B2 | 5/2011 | Tom | |
| 2005/0039178 A1 | 2/2005 | Marolia et al. | |
| 2005/0055397 A1 | 3/2005 | Zhu et al. | |
| 2005/0254652 A1 * | 11/2005 | Engler et al. | 380/270 |
| 2006/0173976 A1 | 8/2006 | Vincent et al. | |
| 2006/0218480 A1 * | 9/2006 | Moggert et al. | 715/500 |
| 2007/0112504 A1 * | 5/2007 | Krause et al. | 701/200 |
| 2007/0156697 A1 * | 7/2007 | Tsarkova | 707/9 |
| 2007/0219908 A1 * | 9/2007 | Martinez | 705/51 |
| 2007/0232358 A1 * | 10/2007 | Sherman | 455/560 |
| 2008/0064367 A1 * | 3/2008 | Nath et al. | 455/411 |
| 2008/0096504 A1 * | 4/2008 | Linkola et al. | 455/187.1 |

OTHER PUBLICATIONS

Office Action mailed Jun. 20, 2011, in U.S. Appl. No. 11/765,779.

* cited by examiner

*Primary Examiner* — Kamran Afshar
*Assistant Examiner* — Mong-Thuy Tran
(74) *Attorney, Agent, or Firm* — Shook, Hardy & Bacon L.L.P.

(57) ABSTRACT

A method, system, and computer-readable media are provided for providing wireless services to an uncertified device. The system comprises a front-end component for receiving a hardware identifier attributes for a plurality of devices. The system further comprises a database for associating and storing the hardware identifier and the attributes for each of the devices. Additionally, the system includes a network operator for receiving a request from a requesting device to access a wireless network, accessing the database to determine if the requesting device is authorized to access the wireless network, formatting data according to the attributes of the requesting device, and providing the formatted data to the requesting device.

18 Claims, 4 Drawing Sheets

GLOBAL WIMAX DEVICE REGISTRY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Today, wireless service providers such as Sprint have certified provisions that detail some level of ownership over the wireless devices that connect to its network. These wireless service providers certify mostly every device on their network before it goes out for sale to a customer. Therefore, a wireless service provider will know many attributes and abilities of a connecting device. With such knowledge, a wireless service provider can determine which devices will be capable of handling certain services and applications, and can apply proper formatting of content based on a device's attributes and abilities.

As the wireless industry moves to Worldwide Interoperability for Microwave Access (WiMAX), the device market may become broad and uncontrolled such that most electronic devices will be able to log onto any WiMAX network. A problem can arise in that wireless service providers may not be able to certify all attributes and capabilities of these devices as it may not have prior knowledge these devices. Without this knowledge, the wireless service provider may not be able to properly format service and applications according to each device's specific capabilities.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The presenting invention is defined by the claims below. Embodiments of the present invention solve at least the above problems by providing a system and method for, among other things, providing wireless services to an uncertified device.

In a first aspect, a set of computer-readable media provide a method that includes associating attributes and a hardware identifier together for each of a plurality of devices in a database. The method further includes receiving a hardware identifier of a requesting device attempting to access a wireless network, and determining the requesting device is authorized to access the wireless network based on the hardware identifier. Moreover, the method includes formatting data according to the capabilities of the first device, and providing the formatted data to the first device.

In a second aspect, a second set of computer-readable media provide a method that includes receiving a request from a device to access a wireless network, wherein the request includes a hardware identifier. The method further includes, determining the device is uncertified based on the hardware identifier, and determining if the hardware identifier is located in a database. Additionally, the method includes retrieving attributes of the device from the database when it is determined the hardware identifier is located in the database, and determining if the device is authorized to access the wireless network based on the attributes. Moreover, the method includes formatting data according to the attributes when it is determined the device is authorized, and providing the formatted data to the device.

In a third aspect, a system provides a front end component for receiving a hardware identifier attributes for a plurality of devices. The system further comprises a database for associating and storing the hardware identifier and the attributes for each of the devices. Additionally, the system includes a network operator for receiving a request from a requesting device to access a wireless network, accessing the database to determine if the requesting device is authorized to access the wireless network, formatting data according to the attributes of the requesting device, and providing the formatted data to the requesting device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The invention introduces a method for wireless service providers to receive information about an uncertified wireless device to determine, based on that piece of information, what the attributes of that device are so that the proper transcoding, application, and services can be delivered to that device. With such information, the wireless service provider can properly format information according to a device's capabilities. Additionally, with this information, instead of failing an uncertified device's connection request, the service provider may be in a better position to allow the uncertified device to access the network by charging the device's usage of the wireless network to a manufacturer, retailer, or the end user.

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. Computer-readable media is directed to a non-transitory medium. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
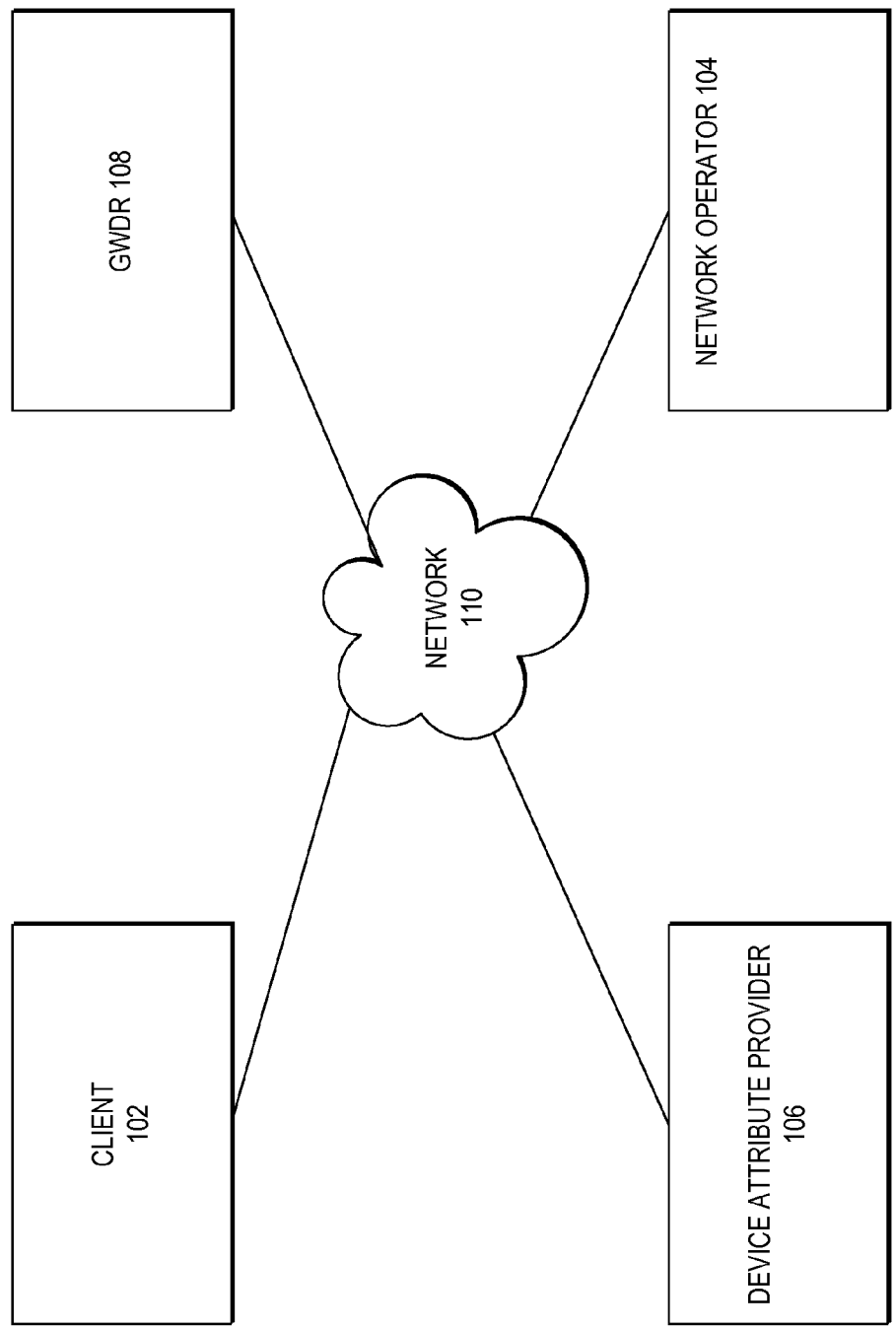
FIG. 1 is a block diagram of an embodiment of a system for implementing the invention.

FIG. 1 is a block diagram of an embodiment of a system 100 for implementing the invention. System 100 includes client 102, network operator 104, device attribute provider 106, Global WiMax Device Registry (GWDR), and network 110. Client 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices.

Client 102 may also be or can include a server such as a workstation running the Microsoft Windows®, MacOS™, Unix™, Linux, Xenix™, IBM AIX™, Hewlett-Packard UX™, Novell Netware™, Sun Microsystems Solaris™, OS/2™, BeOS™, Mach™, Apache™ OpenStep™ or other operating system or platform. Client 102 can include a communication interface. The communication interface may be an interface that can allow the client to be directly connected to any other device or allows the client 102 to be connected to a device over network 110. Network 110 can include, for example, a local area network (LAN), a wide area network (WAN), or the Internet. In an embodiment, the client 102 can be connected to another device via a wireless interface through a wireless network 110 such as a WiMax network for example.

Network operator 104 may be a server such as a workstation running the Microsoft Windows®, MacOS™, Unix™, Linux, Xenix™, IBM AIX™, Hewlett-Packard UX™, Novell Netware™, Sun Microsystems Solaris™, OS/2™, BeOS™, Mach™, Apache™ OpenStep™ or other operating system or platform. Network operator 104 is used to manage access to a wireless service provider's wireless network. In an embodiment, the network operator 104 manages a service provider's WiMAX connectivity network and provides data network connectivity to the Internet or other networks. The network operator 104 can evaluate attributes of a client device 102 to determine whether the device is authorized access the service provider's network, and can determine how to properly deliver services and applications to a client device based on the device's capabilities.

Device attribute provider 106 may be an entity capable of submitting attributes of a client device to database for storage, wherein the attributes define the capabilities of a client device. Such a database may be the GWDR 108. Such entities may include manufacturers, retailers, and end users of client devices. Such attributes may include a hardware identifier, a Media Access Control identifier (MAC ID) for example, the make and model of the device, the authentication capabilities of the device, whether the device has Voice-over Internet Protocol (VOIP) capabilities, whether the device can display video content, whether the device supports video advertisements, whether the device has a keyboard, and other information a network operator can use to provide connectivity, applications, and services to a client device. Device attribute providers 106 may submit device attributes via a website of the GWDR 108, through an email service provided by the entity managing the GWDR 108, or by calling a representative of the entity managing the GWDR 108. In an embodiment, data may be organized within the GWDR 108 by associating the hardware identifier for each device with the device's corresponding attributes. Once the GWDR 108 has been created, a network operator 104 can access the GWDR 108 to obtain attributes of a requesting device to determine if the device is authorized to access the service provider's network. The network operator can also use the attributes to determine how to properly deliver services and applications to the client device.

Figure 2:
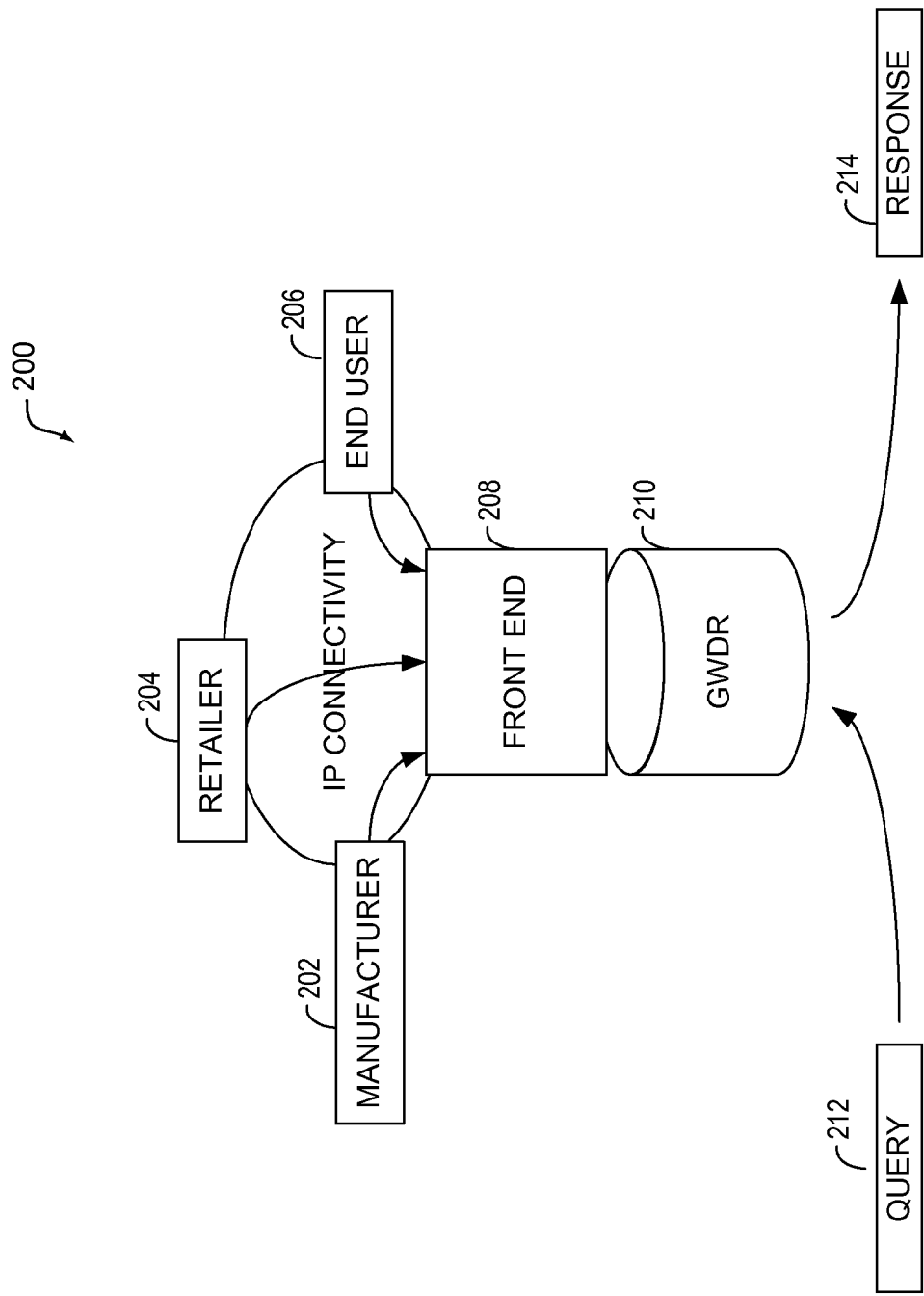
FIG. 2 is a block diagram of an exemplary method for creating a GWDR and for retrieving device attributes.

FIG. 2 is a block diagram of an exemplary method 200 for creating a GWDR and for retrieving device attributes. Device attribute providers such as manufacturers 202, retailers 204, and end-users 206 can each access a front end component 208, a website for example, to submit hardware identifiers and attributes of client devices that they respectively make, sell, and use. Such device attribute providers may have an incentive for making this information available to network operator. One incentive may be so that their client devices can access a service provider's network. Another incentive may be so that the network operator can properly provide applications and services to their client devices according to the capabilities of the devices. The hardware identifiers and attributes can be associated together within GWDR 210. Accordingly, with the GWDR, when a client device uses its hardware identifier to request connectivity from the network operator, the network operator may execute a query 212 to the GWDR for the given hardware identifier and then receive a response 214 informing the network operator of the capabilities of the client device. With this information, the network operator can make intelligent decisions on whether to allow the device to access the wireless network and what types of services and applications to provide to the device.

Figure 3:
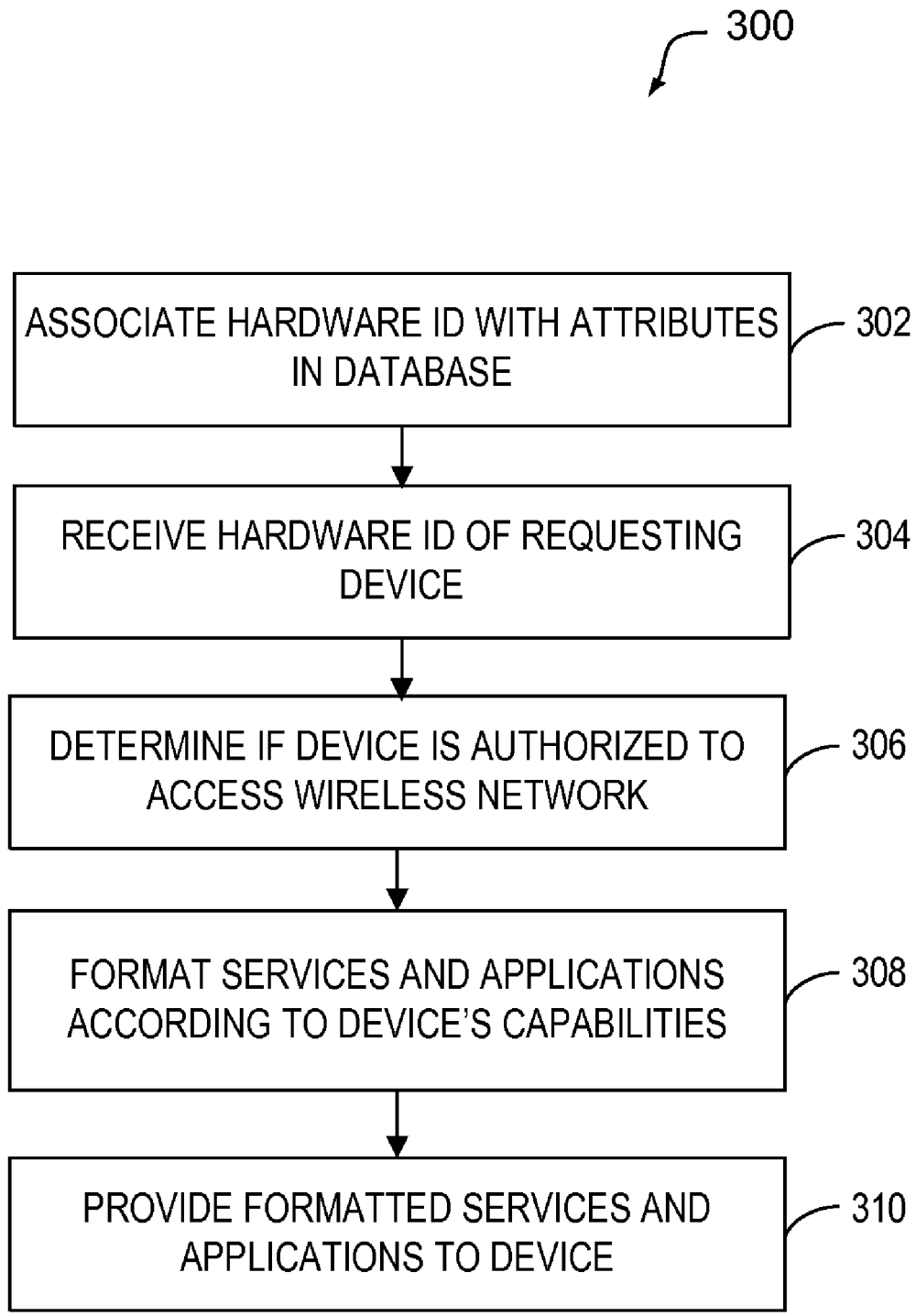
FIG. 3 is a flow diagram of an exemplary method for providing wireless services to an uncertified device.

FIG. 3 is a flow diagram of an exemplary method 300 for providing wireless services to an uncertified device. At operation 302, a hardware identifier and attributes of a device are associated and stored together in database. Operation 302 may be performed for a plurality of devices. Such a database may be a GWDR for example. The hardware identifier and attributes may be obtained from a device attribute provider 106 (FIG. 1). At operation 304, a hardware identifier of a device attempting to access a wireless network is received. In an embodiment, such a wireless network may be a WiMAX network. At operation 306, a determination is made as to whether the device is authorized to access the wireless network. Such a determination can be made by a network operator. In an embodiment, the determination is made by comparing the received hardware identifier to hardware identifiers stored in the database. If an identical match is found, it can be assumed that the requesting device contains the attributes associated with the matched hardware identifier. The network operator can then evaluate the attributes associated with the matched hardware identifier to determine if the device is authorized to access the wireless network. Such attributes may include the authentication capabilities of the device. At operation 308, services and applications of the wireless service provider are formatted according to capabilities of devices authorized to access the wireless network, wherein the capabilities are determined by the attributes associated with the device. At operation 310, the formatted services and applications are transmitted to the requesting device.

Figure 4:
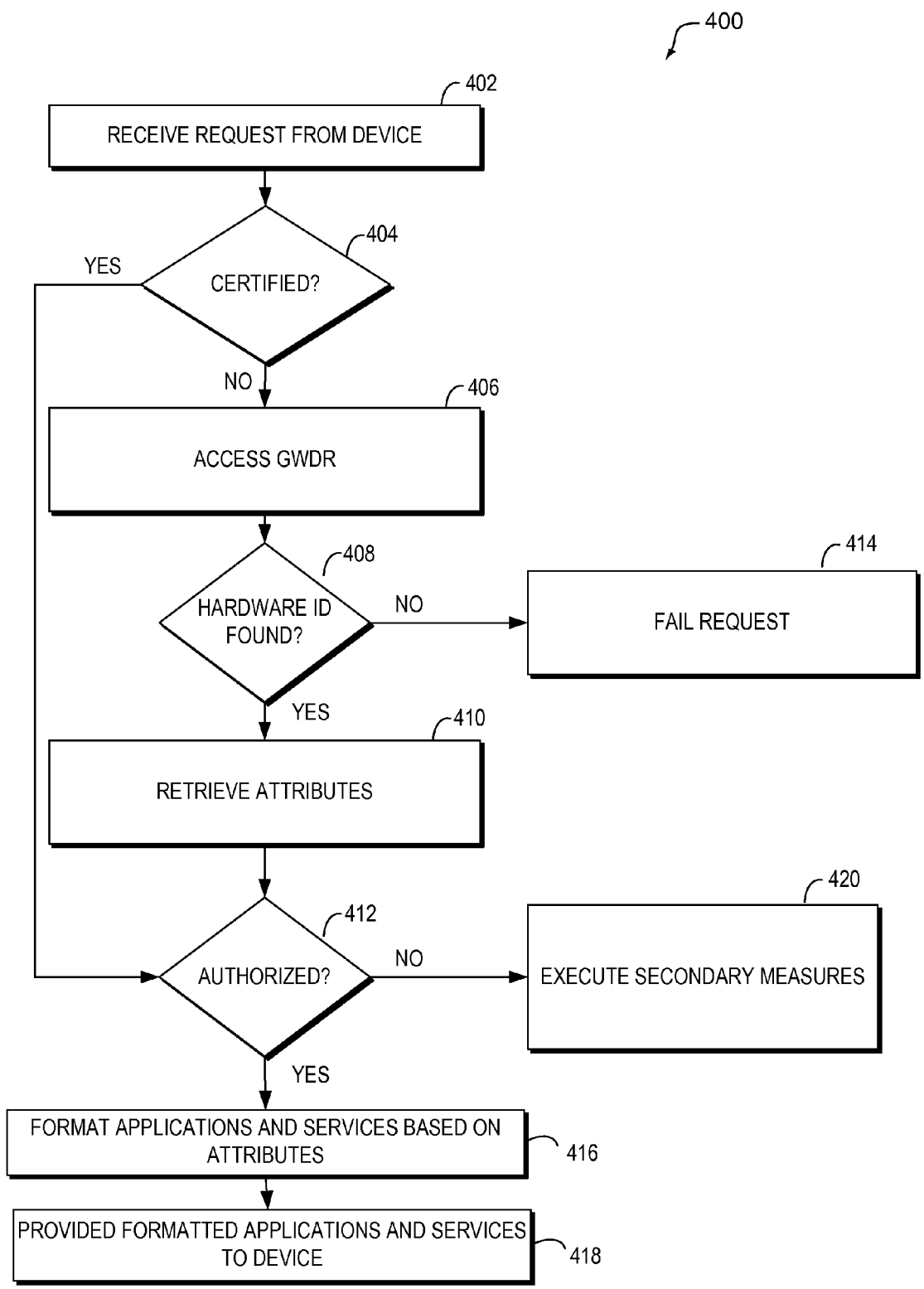
FIG. 4 is another flow diagram of an exemplary method for providing wireless services to an uncertified device.

FIG. 4 is another flow diagram of an exemplary method 400 for providing wireless services to an uncertified device. At operation 402, a request is received from a device to access a wireless network. In an embodiment, such a wireless network may be a WiMAX network. The request may include a hardware identifier of the requesting device, and may be received by a network operator of the wireless service provider. At operation 404, a determination is made as to whether the device has previously been certified by the wireless service provider. In an embodiment, the network operator may have access to a database of network devices and corresponding hardware identifiers for those devices that have been certified by the wireless service provider. The database of certified devices may also contain the attributes associated with each certified device. The network operator can take the hardware identifier of the requesting device and use it to determine if an identical hardware identifier is located in the database of certified devices. If the hardware identifier is found in the database of certified devices, the network operator can format services and applications according to the attributes of the requesting device at operation 416, and can provide the formatted services and applications to the requesting device at operation 418.

At operation 406, the network operator can access the GWDR to determine if the requesting device's hardware identifier is located within the GWDR. A determination is made at operation 408, if the requesting device's hardware identifier is not found within the GWDR, the request is failed at operation 414. If, however, the requesting device's hardware identifier is found in the GWDR, the network operator can retrieve the requesting device's attributes at operation 410. Based on the attributes, a determination is made at operation 412 as to whether the requesting device is authorized to access the wireless network. At operation 416, the network operator formats services and applications according to the capabilities of the requesting device when it is determined that the device is authorized. At operation 418, the formatted services and applications are transmitted to the requesting device.

If it is determined that the requesting device is not authorized to access the wireless network, secondary measures can be taken at operation 420. In an embodiment, one type of secondary measure would be to simply fail the request and disallow the requesting device to access the wireless network. In another embodiment, another type of secondary measure would be to utilize a revenue-generating mechanism. One type of revenue-generating mechanism would be to bill the requesting device's manufacturer for the requesting device's access onto the wireless network. For example, although a requesting device may not have valid authentication attributes, a particular manufacturer may have an account with the wireless service provider that permits the network operator to allow its manufactured devices to connect to the wireless network and charge the manufacturer for the devices' usage of the network. The network operator is able to implement this mechanism since, due to the GWDR, it has knowledge of the capabilities of the requesting device and can format services and applications according to those capabilities.

Another type of revenue-generating mechanism would be to charge advertisers for advertisement content pushed to and accessed by users of devices capable of receiving such advertisement content. For example, although a requesting device may not have valid authentication attributes, the GWDR may inform the network operator that the requesting device contains an advertisement module that can open a software port to detect advertisement content pushed to the device. With this knowledge, the network operator can be configured to at least format and push advertisement content to devices according to the other attributes listed in the GWDR for that device. The network operator can then monitor which advertisements were accessed by these devices, as well as properly authenticated devices, and can charge advertisers accordingly.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions executed by one or more computers for performing a method of providing wireless services to an uncertified wireless device by way of a wireless network, the method comprising:

associating one or more attributes and a hardware identifier for each of a plurality of wireless devices in a global Worldwide Interoperability for Microwave Access device registry (GWDR), wherein the plurality of wireless devices includes wireless devices that are not certified with the wireless network ("uncertified devices"), wherein an uncertified device is a device of which the network has no knowledge prior to receiving an access request from the device, and wherein the one or more attributes define capabilities of a corresponding wireless device;

receiving a request at a network operator from a wireless device to access the wireless network, wherein the wireless device is an uncertified device, and wherein the request includes the hardware identifier associated with the wireless device;

querying the GWDR for the hardware identifier;

as a result of querying the GWDR for the hardware identifier, receiving from the GWDR at least one attribute that is associated with the hardware identifier, wherein the at least one attribute is specific to the wireless device;

determining the wireless device is authorized to access the wireless network based on the result of querying the GWDR;

formatting data according to the at least one attribute of the wireless device, wherein formatting data comprises customizing services and applications according to the capabilities of the wireless device defined by the at least one attribute specific to the wireless device received from the GWDR;

providing a formatted data from the network operator to the wireless device;

delivering customized services to the wireless device according to the attributes of the wireless device; and enabling applications in the wireless device according to the attributes of the wireless device.

2. The media according to claim 1, wherein determining the wireless device is authorized to access the wireless network comprises accessing the GWDR to find an identical hardware identifier to the hardware identifier.

3. The media according to claim 2, wherein the wireless device is authorized to access the wireless network when the identical identifier is found.

4. The media according to claim 1, wherein the wireless network is a Worldwide Interoperability for Microwave Access (WIMAX) network.

5. The media according to claim 1, wherein the one or more attributes and hardware identifier are obtained from one or more device attribute providers.

6. The media according to claim 5, wherein the one or more device attribute providers include at least one of a manufacturer, a retailer, and an end-user.

7. The media according to claim 1, wherein the hardware identifier is a Media Access Control identifier.

8. One or more non-transitory computer-readable media having computer-useable instructions executed by one or more computers for performing a method of providing wireless services to an uncertified device, the method comprising:

receiving a request from a wireless device to access a Worldwide Interoperability for Microwave Access (WIMAX) network, the request including a hardware identifier;

determining the wireless device is uncertified based on the hardware identifier;

determining if the hardware identifier is located in a global Worldwide Interoperability for Microwave Access device registry (GWDR);

retrieving one or more attributes of the wireless device from the GWDR when it is determined that the hardware identifier is located in the GWDR;

determining if the wireless device is authorized to access the WIMAX network based on the one or more attributes;

formatting data according to the one or more attributes when it is determined that the wireless device is authorized wherein formatting data comprises customizing services and applications according to capabilities of the wireless device defined by the at least one attribute specific to the wireless device received from the GWDR;

providing a formatted data from the network operator to the first wireless device;

delivering customized services to the wireless device according to the attributes of the wireless device; and enabling applications in the wireless device according to the attributes of the wireless device.

9. The media according to claim 8, further comprising denying the request when it is determined that the hardware identifier is not located in the database.

10. The media according to claim 8, further comprising using a mechanism to generate revenue when it is determined the wireless device is not authorized to access the WIMAX network based on the one or more attributes.

11. The media according to claim 10, wherein the mechanism comprises charging a manufacturer in order to allow the wireless device to access the WIMAX network.

12. The media according to claim 10, wherein the mechanism comprises pushing an advertisement content to the wireless device.

13. The media according to claim 12, wherein the mechanism further comprises charging an advertiser based on a number of times the advertisement content is accessed.

14. A system for providing wireless services to an uncertified device, comprising:

a front end component for receiving a hardware identifier and one or more attributes from at least one device attribute provider for each of a plurality of wireless devices, wherein for each of the wireless devices the one or more attributes define one or more capabilities that are specific to the wireless device;

a global Worldwide Interoperability for Microwave Access device registry (GWDR) for associating and storing the hardware identifier and the one or more attributes for each of the plurality of wireless devices; and a network operator for receiving a request from a requesting wireless device to access a Worldwide Interoperability for Microwave Access (WIMAX) network, accessing the GWDR to determine if the requesting wireless device is authorized to access the WIMAX network, formatting data according to the one or more attributes of the requesting wireless device wherein formatting data comprises customizing services and applications according to capabilities specific to the requesting wireless device defined by the one or more attributes received from the GWDR, and providing a formatted data to the requesting wireless device.

15. The system according to claim 14, wherein the at least one device attribute provider includes at least one of a manufacturer, a retailer, and an end-user.

16. The system according to claim 14, wherein the front end component is a website.

17. The system according to claim 14, wherein the network operator uses a mechanism to generate revenue when it is determined the requesting wireless device is not authorized to access the wireless network.

18. The system according to claim 14, wherein the network operator denies the request when it is determined a hardware identifier of the requesting wireless device is not located in the database.

* * * * *